United States Patent
Chen et al.

(10) Patent No.: US 6,276,709 B1
(45) Date of Patent: Aug. 21, 2001

(54) STROLLER

(75) Inventors: Er-Jui Chen, Kaohsiung; Pao-Shan Huang, Tai-Pao, both of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/291,207

(22) Filed: Apr. 14, 1999

(30) Foreign Application Priority Data

Jun. 29, 1998 (TW) .................................. 87210396

(51) Int. Cl.⁷ ....................................................... B62B 7/06
(52) U.S. Cl. ........................ 280/650; 280/642; 280/647; 280/658; 280/47.38
(58) Field of Search .................... 280/650, 642, 280/647, 42, 47.38, 658, 657, 38, 641

(56) References Cited

U.S. PATENT DOCUMENTS

| | | | |
|---|---|---|---|
| 5,181,735 | * 1/1993 | Onishi | 280/642 |
| 5,938,230 | * 8/1999 | Huang et al. | 280/650 |
| 6,073,957 | * 6/2000 | Lan | 280/642 |

* cited by examiner

*Primary Examiner*—J. J. Swann
*Assistant Examiner*—J. Allen Shriver
(74) *Attorney, Agent, or Firm*—Birch, Stewart, Kolasch & Birch, LLP

(57) ABSTRACT

A stroller includes two front legs, two positioning bases each secured on the upper end of one of the two front legs, two handles each detachably secured in one of the two positioning bases, two support bars each having its upper end pivotally attached to the lower end of one of the two handles, two rear legs each having an upper end pivotally attached to one of the two positioning bases and a lower end pivotally attached to the lower end of one of the two support bars, and two locking devices each mounted on one of the two positioning bases with each detachably securing one of the two handles to the respective positioning base.

12 Claims, 5 Drawing Sheets

STROLLER

CROSS-REFERENCES TO RELATED APPLICATIONS

Not Applicable.

BACKGROUND OF THE INVENTION

1. Field of the Invention

The present invention relates to a stroller and specifically to a stroller that can be folded and carried on a user's shoulders.

2. Description of the Related Art

A conventional stroller in accordance with the prior art shown in FIG. 6 comprises two front legs (80), two pivot bases (810) each secured to one of the two front legs (80), two rear legs (84) each pivotally attached to one of the two pivot bases (810), two foldable linkages (85) each pivotally mounted between a front leg (80) and a rear leg (84), two positioning bases (81) each secured on the upper end of one of the two front legs (80) and each formed with a locking post (811), two handles (82) each pivotally attached to one of the two positioning bases (81), two locking hooks (822) each pivotally mounted on one of the two handles (82) and each detachably secured on the locking post (811), two springs (821) each mounted between the locking hook (822) and the positioning base (81), a seat (831) mounted between the two front legs (80), and two straps (87) mounted between the seat (831) and the two front legs (80).

In operation, each of the locking hooks (822) is pivoted relative to the respective handle (82) to detach from the respective locking post (811) such that each of the handles (82) is pivoted relative to the respective positioning base (81) from the position as shown in solid lines to the position as shown in phantom lines. Each of the linkages (85) is then pressed upward in the direction indicated by the arrow such that each of the rear legs (84) is pivoted toward the respective front leg (80), thereby folding the stroller. In such a folded state, the stroller can be carried on a user's shoulders by means of the straps (87). However, the user has to pivot the handles (82) relative to the positioning bases (81) and then to pivot the rear legs (84) relative to the front legs (80) so as to fold the stroller such that the process of folding the stroller is a little complicated, thereby causing inconvenience to the user. The present invention has arisen to mitigate and/or obviate the disadvantage of the conventional stroller.

BRIEF SUMMARY OF THE INVENTION

In accordance with one aspect of the present invention, there is provided a stroller comprising two front legs each having an upper end and a lower end; two positioning bases each secured on the upper end of one of the two corresponding front legs; two handles each detachably secured in one of the two corresponding positioning bases and each having an upper end and a lower end; two support bars each having an upper end and a lower end, with the upper end pivotally attached to the lower end of one of the two corresponding handles; two rear legs each having an upper end pivotally attached to one of the two corresponding positioning bases, and a lower end pivotally attached to the lower end of one of the two corresponding support bars; and two locking devices each mounted on one of the two corresponding positioning bases, each detachably securing one of the two corresponding handles to the respective positioning bases.

Further benefits and advantages of the present invention will become apparent after a careful reading of the detailed description with appropriate reference to the accompanying drawings which are given by way of illustration only, and thus are not limitative of the present invention.

DETAILED DESCRIPTION OF THE INVENTION

Figure 1:
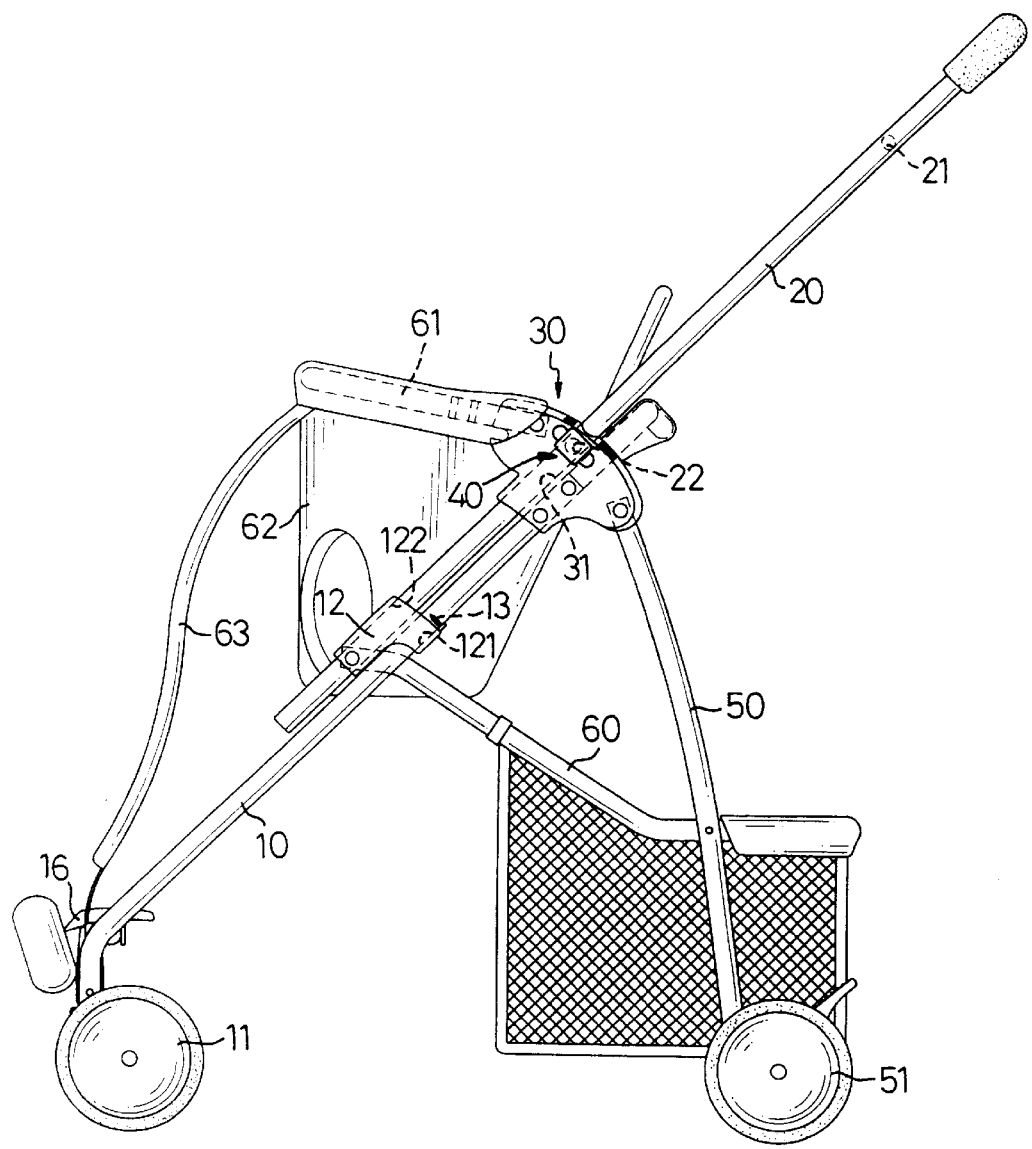
FIG. 1 is a side plan view of a stroller in accordance with the present invention.
Figure 2:
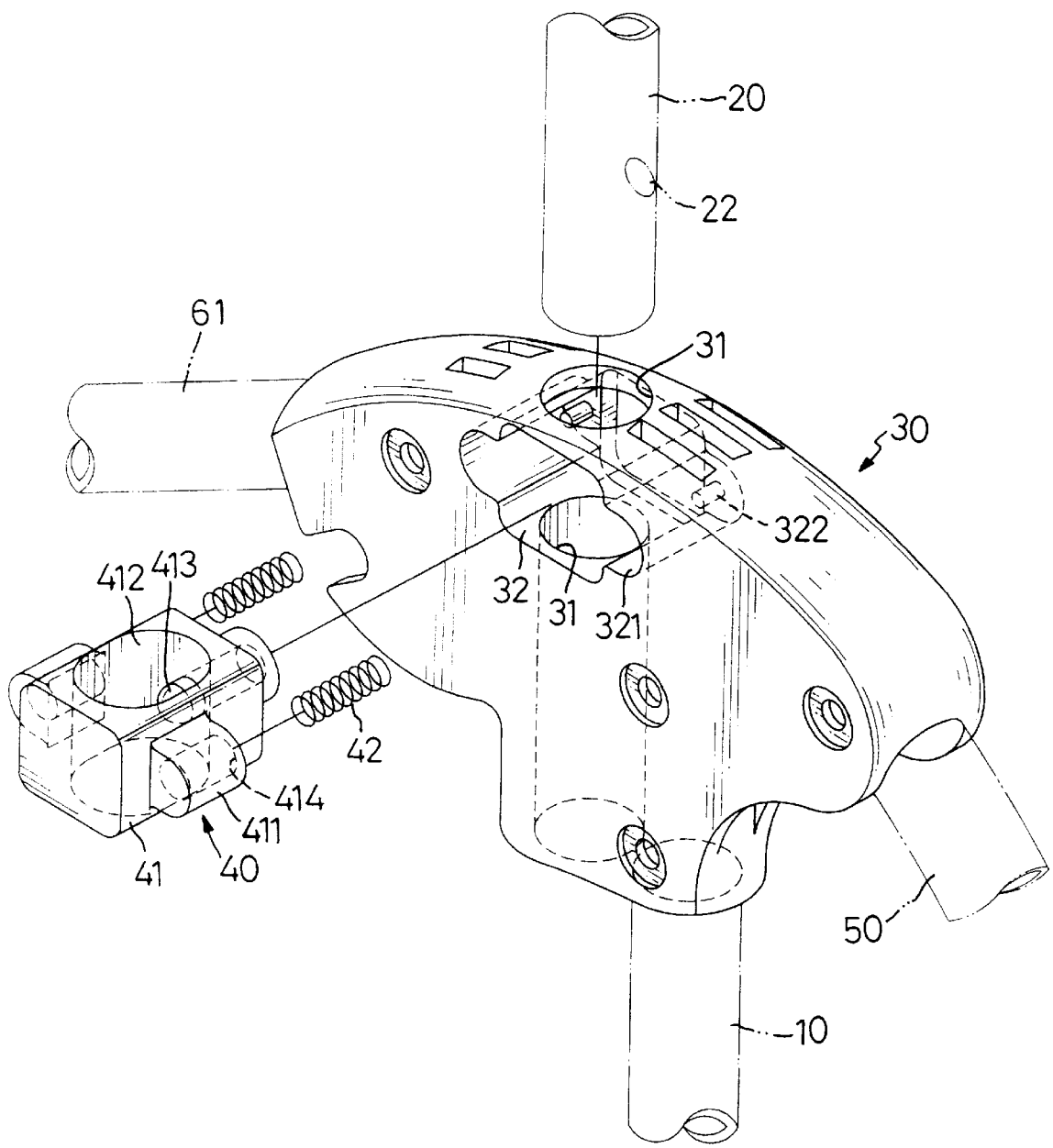
FIG. 2 is an exploded perspective view of the positioning base and locking device of the stroller as shown in FIG. 1.
Figure 3:
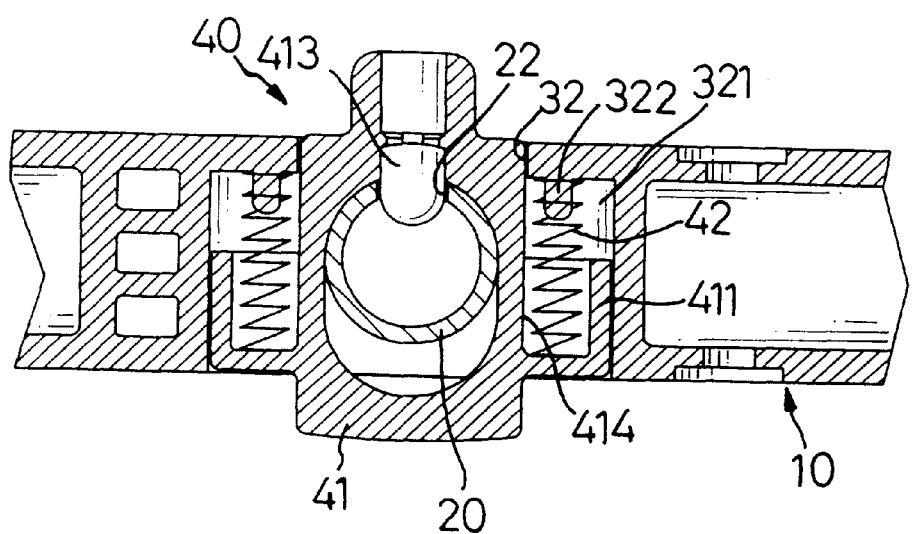
FIG. 3 is a top plan cross-sectional assembly view of the positioning base and locking device of the stroller as shown in FIG. 2.

Referring now to FIGS. 1–3, a stroller in accordance with the present invention comprises two front legs (10), two front wheels (11) each rotatably attached to the lower end of one of the two corresponding front legs (10), two positioning bases (30) each secured on the upper end of one of the two corresponding front legs (10), a substantially inverted U-shaped push handle (not numbered) including two handles (20) each detachably secured in one of the two corresponding positioning bases (30), two support bars (60) each having an upper end pivotally attached to the lower end of one of the two corresponding handles (20), two rear legs (50) each having an upper end pivotally attached to one of the two corresponding positioning bases (30), and a lower end pivotally attached to the lower end of one of the two corresponding support bars (60), two rear wheels (51) each rotatably attached to the lower end of one of the two corresponding rear legs (50), and two locking devices (40) each mounted on one of the two corresponding positioning bases (30) and each detachably securing one of the two corresponding handles (20) to the respective positioning base (30).

The stroller further comprises two armrests (61) each secured to one of the two corresponding positioning bases (30), a seat (62) mounted between the two armrests (61), and two straps (63) each having the upper end attached to the seat (62) and the lower end attached to a support member (16) that is located between the lower ends of the two front legs (10).

The stroller further comprises two slide connectors (12) each secured to the lower end of one of the two corresponding handles (20) to slide therewith, and each slidably mounted on one of the two corresponding front legs (10), and the upper end of each of the two support bars (60) is pivotally attached to one of the two corresponding slide connectors (12). Each of the two slide connectors (12) contains a first channel (121) to slidably receive the respective front leg (10) therein, and a second channel (122) to securely receive the lower end of the respective handle (20) therein.

The stroller further comprises two limiting screws (13) each secured on one of the two corresponding front legs (10) and each abutting one of the two corresponding slide connectors (12) to limit the uppermost position of the respective slide connector (12).

Each of the two positioning bases (30) further contains a passage (31) longitudinally defined therein, and a space (32) transversely defined therein and connecting to the passage (31). Each of the two locking devices (40) includes a slide base (41) slidably received in the space (32) and containing an elongated channel (412) longitudinally defined therein and connecting to the passage (31), and a locking boss (413) extending inward from the wall of the channel (412).

Each of the two handles (20) in turn extends through the passage (31) of one of the two corresponding positioning bases (30) and the channel (412) of the slide base (41) of one of the two corresponding locking devices (40), and contains an upper locking bore (21) transversely defined in the upper end thereof, and a lower locking bore (22) transversely defined in the lower end thereof, whereby the locking boss (413) can be detachably received in the lower locking bore (22) or the upper locking bore (21).

The space (32) in each of the two positioning bases (30) has two opposed sides each containing a cavity (321) therein, and the slide base (41) of each of the two locking devices (40) has two opposed sides each formed with an ear (411) extending outward and slidably received in the cavity (321). The cavity (321) on each of the two sides of each of the two positioning bases (30) includes a retaining stub (322) extending toward the ear (411). The ear (411) on each of the two sides of the slide base (41) of each of the two locking devices (40) contains a recess (414) therein. Each of the two locking devices (40) further comprises two biasing members (42) each received in the recess (414) and each having a first end pressing the inner wall of the ear (411) and a second end secured over the retaining stub (322).

In operation, referring to 3–5 with reference to FIGS. 1 and 2, the locking boss (413) is initially secured in the lower locking bore (22) as shown in FIG. 3 by means of the biasing members (42) exerting a force on the ears (411) of the slide base (41) such that each of the two handles (20) is secured to the respective positioning base (30) by the locking device (40).

Figure 4:
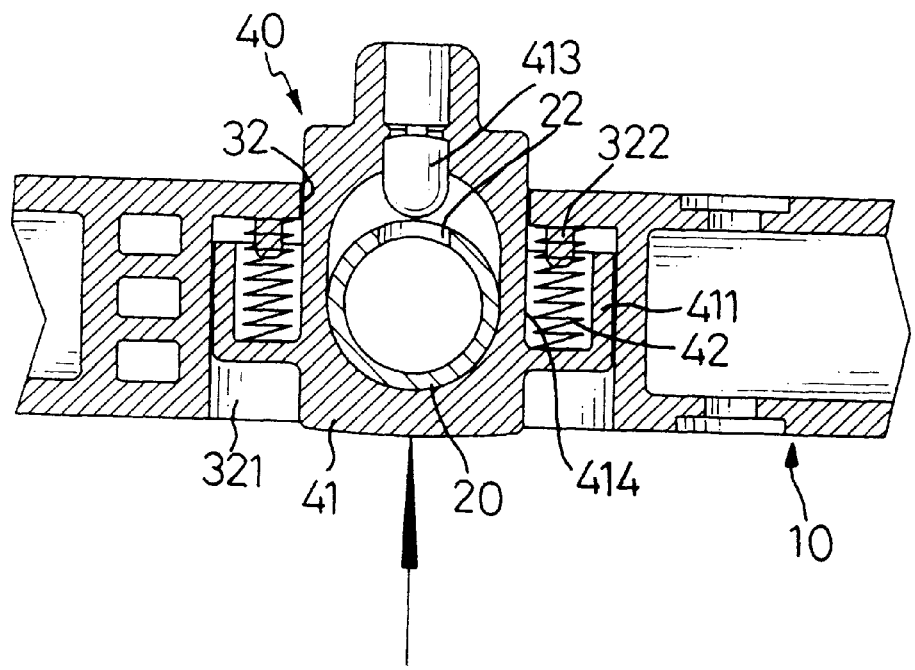
FIG. 4 is an operational view of FIG. 3.
Figure 5:
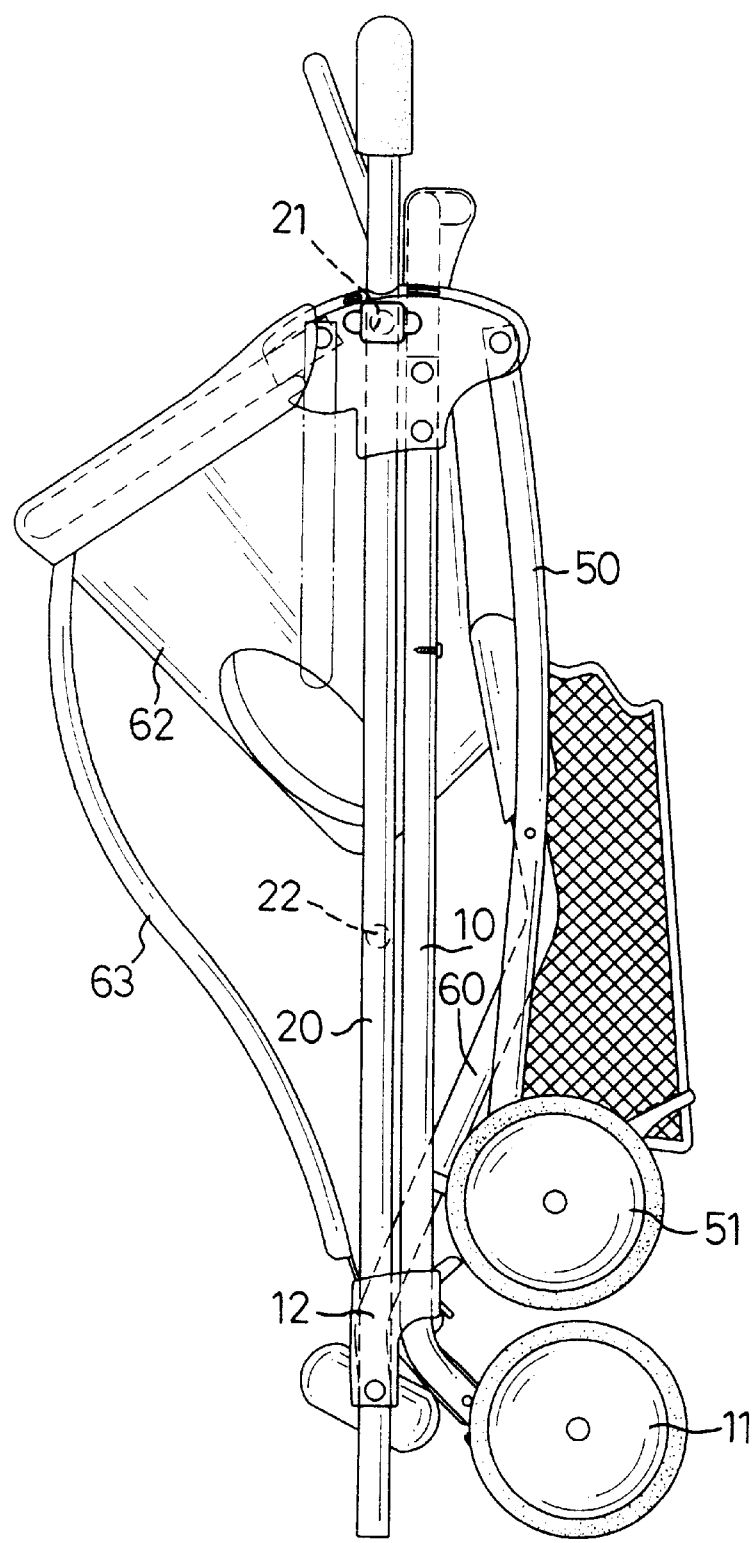
FIG. 5 is a side plan view of the stroller as shown in FIG. 1, wherein the stroller is in a folded state.
Figure 6:
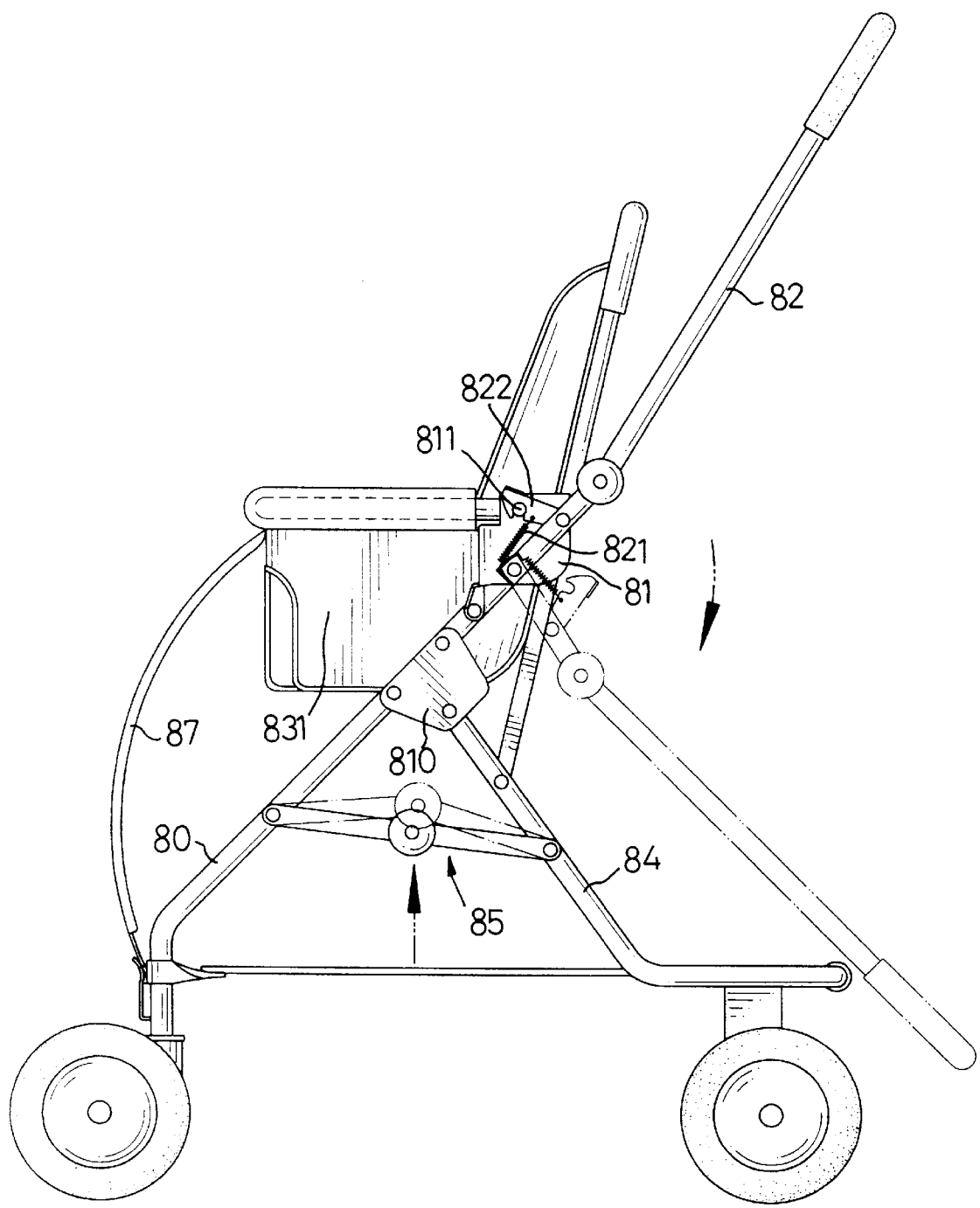
FIG. 6 is a side plan view of a conventional stroller in accordance with the prior art.

The slide base (41) is then pressed to move from the position as shown in FIG. 3 to the position as shown in FIG. 4 to detach the locking boss (413) from the locking bore (22) such that each of the two handles (20) can slide downward in the respective positioning base (30). Each of the slide connectors (12) is then moved with the respective handle (20) to slide downward on the respective front leg (10), thereby moving the upper end of each of the support bars (60) downward so as to pivot each of the support bars (60) relative to the respective slide connector (12), and to pivot each of the rear legs (50) relative to the respective support bar (60) from the position as shown in FIG. 1 to the position as shown in FIG. 5, thereby folding the stroller. At the same time, the locking boss (413) is received in the upper locking bore (21) of the respective handle (20). In such a manner, the stroller can be carried on a user's shoulders by means of the straps (63) when folded.

Accordingly, the two handles (20) can be pushed downward by means of pressing the slide base (41) of each of the two locking devices (40) to detach the locking boss (413) from the locking bore (22), thereby pivoting the two support bars (60) and the two rear legs (50) so as to fold the stroller. In such a manner, the stroller can be easily folded and expanded. In addition, it is necessary to simultaneously press the two locking devices (40) and push the two handles (20) downward so as to fold the stroller such that the stroller cannot be easily folded when a person unintentionally presses one of the two locking devices (40), thereby ensuring the safety of the stroller.

It should be clear to those skilled in the art that further embodiments may be made without departing from the scope and spirit of the present invention.

What is claimed is:

1. A stroller comprising:
    two front legs each having an upper end and a lower end;
    two positioning bases, each of the two front legs at the upper end having a respective one of the positioning bases secured thereto;
    two handles each having an upper end and a lower end, each of the positioning bases having a respective one of the handles detachably secured thereto;
    two support bars each having an upper end and a lower end, each of the handles at their lower ends having a respective one of the upper ends of the support bars pivotally attached thereto;
    two rear legs each having an upper end and a lower end, each of the positioning bases having a respective one of the upper ends of the rear legs pivotally attached thereto, each of the support bars having a respective one of the lower ends of the rear legs pivotally attached thereto;
    two locking devices, each of the positioning bases having a respective one of the locking devices for detachably securing a respective one of the handles to the respective positioning base; and
    two slide connectors secured to the lower end of a respective one of the corresponding handles, each of the slide connectors being slidably mounted on a respective one of the front legs, wherein the upper end of each of the two support bars is pivotally attached to a respective one of the slide connectors.

2. The stroller in accordance with claim 1, wherein each of the two positioning bases contains a passage longitudinally defined therein and a space transversely defined therein, the space in each positioning base being connected to a respective one of the passages, each of the two locking devices includes a slide base, each slide base being slidably received in a respective one of the spaces and each slide base contains an elongated channel longitudinally defined therein, each of the elongated channels being connectable to a respective one of the passages, each of the locking devices further containing a locking boss extending inwardly from a wall of the channel in the respective locking device, each of the handles extends through a respective one of the passages of the position bases and a respective one of the channels of the slide bases and each handle having at least one locking bore transversely defined therein to detachably receive a respective one of the locking bosses therein.

3. The stroller in accordance with claim 2, each of the spaces of each of the two positioning bases has two opposed sides which contain a cavity therein and wherein each of the slide bases of the locking devices has two opposed sides each formed with an ear, the ears of a slide base being received in a respective one of the cavities.

4. The stroller in accordance with claim 3, wherein the cavity of each of the two sides of the positioning bases includes a retaining stub extending toward a respective one of the ears, the ear of each of the slide bases of the two locking devices contains a recess defined therein, each of the two locking devices further comprises two biasing members received in a respective one of the recesses and each of the biasing members having a first end pressing a respective one of the ears and a second end secured to a respective one of the retaining stubs.

5. The stroller in accordance with claim 1, further comprising two limiting screws, each of the front legs having one of the limiting screws secured thereto and the screws being abuttable with a respective one of the slide connectors to limit an uppermost position of the respective one of the slide connectors.

6. The stroller in accordance with claim 1, further comprising two arm rest, two straps and a seat, each of the positioning bases having a respective one of the arm rests secured thereto, the seat being mounted between the armrests and each of the two straps being attached to the seat.

7. The stroller in accordance with claim 6, wherein each of the two arm rests are received in an opening of a respective one of the positioning bases and wherein each of the positioning bases receives a respective one of the arm rests, rear legs and front legs in a plane and wherein each of the locking devices in a respective one of the positioning bases has a slide base which is received in an opening of the respective positioning base and which moves in a direction generally parallel to the plane in which the arm rest, rear leg and front leg are received in the respective positioning base.

8. The stroller in accordance with claim 7, wherein the seat is pivotally mounted to the positioning bases.

9. The stroller in accordance with claim 8, wherein the seat is located adjacent and in front of the positioning bases when the stroller is in an open position.

10. The stroller in accordance with claim 9, further comprising two limiting screws, each of the front legs having one of the limiting screws secured thereto and the screws being abuttable with a respective one of the slide connectors to limit an uppermost position of the respective one of the slide connectors.

11. The stroller in accordance with claim 10, further comprising two biasing members for each of the slide bases, the biasing members urging the slide bases away from the plane in which the arm rest, rear leg and front leg are received in the respective positioning base.

12. The stroller in accordance with claim 11, wherein the positioning bases have a t-shape and wherein the openings on the positioning bases which receive the slide bases extend through a side of the positioning bases.

* * * * *